United States Patent
Gim et al.

(10) Patent No.: US 11,733,567 B2
(45) Date of Patent: Aug. 22, 2023

(54) LIGHT MODULATION DEVICE

(71) Applicant: LG Chem, Ltd., Seoul (KR)

(72) Inventors: Min Jun Gim, Daejeon (KR); Jung Sun You, Daejeon (KR); Cheol Ock Song, Daejeon (KR); Dong Hyun Oh, Daejeon (KR); Nam Gyu Kim, Daejeon (KR); Jin Hong Kim, Daejeon (KR); Jung Woon Kim, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 17/640,612

(22) PCT Filed: Oct. 8, 2020

(86) PCT No.: PCT/KR2020/013697
§ 371 (c)(1),
(2) Date: Mar. 4, 2022

(87) PCT Pub. No.: WO2021/071263
PCT Pub. Date: Apr. 15, 2021

(65) Prior Publication Data
US 2022/0350185 A1 Nov. 3, 2022

(30) Foreign Application Priority Data
Oct. 10, 2019 (KR) ......................... 10-2019-0125448

(51) Int. Cl.
*G02F 1/1339* (2006.01)
*G02F 1/1335* (2006.01)

(52) U.S. Cl.
CPC .... *G02F 1/13394* (2013.01); *G02F 1/133528* (2013.01); *G02F 2202/022* (2013.01)

(58) Field of Classification Search
CPC .......... G02F 1/13394; G02F 1/133528; G02F 2202/022; G02F 1/133377;
(Continued)

(56) References Cited

U.S. PATENT DOCUMENTS 5,978,062 A 11/1999 Liang et al.
2006/0209246 A1* 9/2006 Kim .................. G02F 1/133377
349/155
(Continued)

FOREIGN PATENT DOCUMENTS

JP 3251519 B2 1/2002
JP 2007304449 A 11/2007
(Continued)

OTHER PUBLICATIONS

Extended European Search Report for 20874864.0 dated Oct. 12, 2022. 5 pgs.
(Continued)

*Primary Examiner* — Mariam Qureshi
(74) *Attorney, Agent, or Firm* — Lerner David LLP (57) ABSTRACT

A light modulation device is disclosed herein. The light modulation device can properly maintain a cell gap by controlling the shape and arrangement of spacers and the like, and is applicable for various applications by effectively controlling omnidirectional light leakage in a black mode, while having excellent optical properties, including transmittance-variable characteristics and haze characteristics, and the like.

15 Claims, 3 Drawing Sheets

(58) Field of Classification Search
CPC ......... G02F 1/133531; G02F 1/133305; G02F 1/13398; G02F 2202/28; E06B 2009/2464; E06B 9/24; G02B 26/02; G02B 5/30; G02B 1/04; G02B 5/20; C08L 83/04
See application file for complete search history.

(56) References Cited

U.S. PATENT DOCUMENTS

| | | | |
|---|---|---|---|
| 2010/0165450 | A1 | 7/2010 | Okuyama et al. |
| 2014/0130968 | A1* | 5/2014 | Hung .................... G03F 7/0002 156/247 |
| 2016/0091726 | A1 | 3/2016 | Yoon |
| 2018/0074377 | A1 | 3/2018 | You et al. |
| 2020/0019008 | A1 | 1/2020 | Jeon et al. |

FOREIGN PATENT DOCUMENTS

| | | |
|---|---|---|
| JP | 2010156811 A | 7/2010 |
| JP | 2011154202 A | 8/2011 |
| JP | 2017062362 A | 3/2017 |
| JP | 2019070781 A | 5/2019 |
| KR | 101557766 B1 | 10/2015 |
| KR | 20160039103 A | 4/2016 |
| KR | 20160100575 A | 8/2016 |
| KR | 20160146566 A | 12/2016 |
| KR | 20170006084 A | 1/2017 |
| KR | 20180119520 A | 11/2018 |

OTHER PUBLICATIONS

International Search Report for PCT/KR2020/013697 dated Jan. 14, 2021. 2 pgs.

* cited by examiner

LIGHT MODULATION DEVICE

CROSS-REFERENCE TO RELATED APPLICATION

This application is a national phase entry under 35 U.S.C. § 371 of International Application No. PCT/KR2020/013697, filed on Oct. 8, 2020, which claims priority from Korean Patent Application No. 10-2019-0125448, filed on Oct. 10, 2019, the disclosures of which are incorporated by reference herein.

TECHNICAL FIELD

The present application relates to a light modulation device.

BACKGROUND ART

A light modulation device means a device capable of switching between at least two or more different states. Such devices are used for, for example, wearable devices, such as eyewear of glasses or sunglasses, and the like, mobile devices, devices for virtual reality (VR) and devices for augmented reality (AR), or vehicle sunroofs, and the like, the applications of which are gradually expanded.

Figure 3:
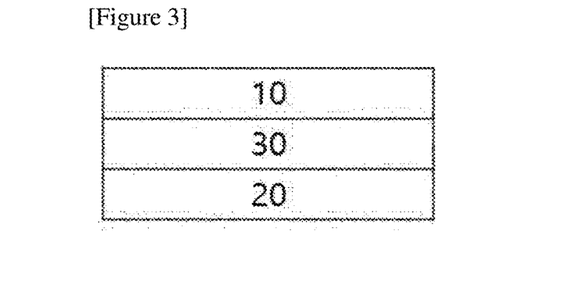
FIG. 3 is a schematic diagram of an exemplary light modulation device.

The light modulation device has a structure comprising two opposing polarization layers (10, 20) and a light modulation layer (30) present between the polarization layers, as shown in FIG. 3. When a film base material is applied to a light modulation device based on such two polarization layers, it is common that an adhesive layer such as OCA is applied thereto together to impart mechanical superiority, and it is possible to introduce partition-typed spacers, for supporting the device and maintaining the cell gap.

In this regard, Patent Document 1 (KR Laid-Open Patent Publication No. 10-2016-0100575) discloses a technique of forming a honeycomb-shaped pillar pattern on one substrate and fixing it to the opposite substrate using an adhesive. However, in the case of a device to which a honeycomb-shaped pillar pattern is applied, there is a problem of light leakage, especially, in the black mode.

DISCLOSURE

Technical Problem

The present application relates to a light modulation device. It is one object of the present application to provide a light modulation device which has excellent optical properties, including transmittance-variable characteristics and haze characteristics, by appropriately controlling the shape and arrangement of spacers, and the like, and is applicable for various applications by controlling light leakage in a black mode.

Technical Solution

The angle defined in this specification should be understood in consideration of an error such as a manufacturing error or a variation. For example, in this specification, the term vertical, parallel, orthogonal, horizontal or any numerical value, and the like means substantially vertical, parallel, orthogonal, horizontal or any numerical value in a range that does not impair the purpose and effect. For example, in each case, the vertical, parallel, orthogonal, horizontal or any numerical value may include an error within about ±3 degrees, an error within about ±2 degrees, an error within about ±1 degree or an error within about ±0.5 degrees.

Among physical properties mentioned in this specification, when the measurement temperature affects the relevant physical property, the physical property is a physical property measured at room temperature, unless otherwise specified.

In this specification, the term room temperature is a temperature in a natural state that is not particularly warmed or decreased, which may mean any one temperature in a range of about 10° C. to 30° C., for example, a temperature of about 15° C. or more, 18° C. or more, 20° C. or more, or about 23° C. or more, and about 27° C. or less. In addition, unless otherwise specified, the unit of temperature referred to in this specification is ° C.

The present application may be directed to a light modulation device in which an upper substrate, a light modulation layer and a lower substrate are sequentially formed. In this specification, the upper substrate may be referred to as a first substrate, and the lower substrate may be referred to as a second substrate. In one example, the upper substrate of the present application may comprise a first polymer film substrate in which an adhesive layer or a pressure-sensitive adhesive layer is formed on a first surface and a first polarization layer is attached to a second surface, and the lower substrate may comprise a second polymer film substrate in which a liquid crystal alignment film is formed on a first surface and a second polarization layer is attached to a second surface, wherein the first and second polymer film substrates may be arranged so that the respective first surfaces face each other. In addition, the interval (cell gap) between the first and second polymer film substrates may be maintained with spacers.

Figure 1:
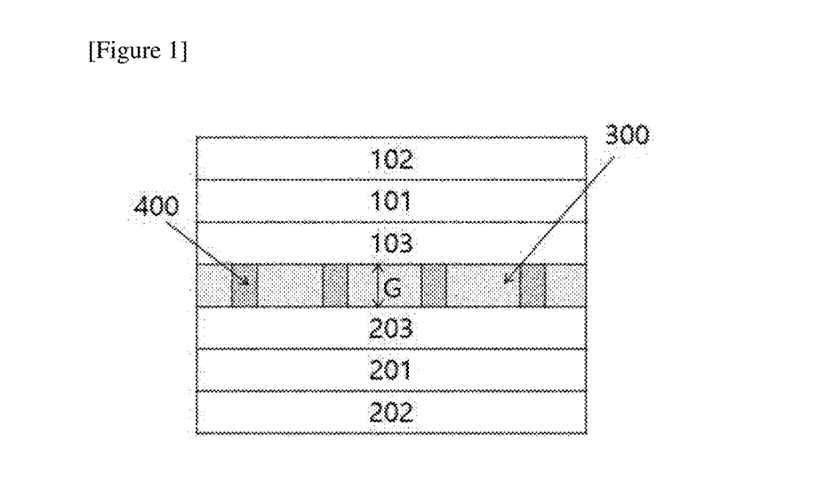
FIGS. 1 and 2 are schematic diagrams of exemplary light modulation devices of the present application.

In one example, the light modulation device of the present application comprises a first polarization layer (102), a first polymer film substrate (101), an adhesive layer (or a pressure-sensitive adhesive layer) (103), a light modulation layer (300), a liquid crystal alignment film (203), a second polymer film substrate (201) and the second polarization layer (202), which are sequentially formed, wherein the cell gap (G) between the first and second polymer film substrates may be maintained with the spacers (400), as shown in FIG. 1.

In the present application, the shape, arrangement and/or disposition method of the spacers may be appropriately designed within a range capable of exhibiting a desired effect.

In one example, the spacer of the present application may be a tetragonal partition spacer. In the present application, the term tetragonal partition spacer means, as a spacer formed in the form of a partition, a spacer that when the spacer is viewed from the top, the closed figure formed by the partition forms a tetragon. In this specification, such a tetragonal partition spacer may also be referred to as a spacer in the form of a tetragonal partition. As described above, the inventors have confirmed that the light leakage can be prevented, particularly, in the black mode by controlling the shape of the spacer into, for example, a tetragonal partition shape while introducing spacers to maintain the cell gap between the first and second polymer film substrates as above. The spacer may be more preferably a square or rectangular partition shape in terms of achieving the object of the present application.

The light leakage prevention effect and haze control effect in the black mode by controlling the shape of the spacer may be more maximized according to the content of the present application to be described below.

While the light modulation device of the present application maintains, for example, the cell gap between the first and second polymer film substrates through the spacers in the form of a tetragonal partition, as described above, it is possible by performing a unique arrangement, which is described below, to provide a light modulation device having excellent optical characteristics in which the cell gap is properly maintained and simultaneously the light leakage and haze are effectively controlled in the black mode, and the like.

In the light modulation device of the present application, when the spacer in the form of a tetragonal partition is observed from the top, the partition forming each side of the tetragon may be formed to have a specific positional relationship with the slow axis of the first polymer film substrate, the slow axis of the second polymer film substrate, the absorption axis of the first polarization layer and/or the absorption axis of the second polarization layer.

In this specification, the term side of spacer used while defining the angular relationship between the slow axes of the first and second polymer film substrates, and the absorption axes or transmission axes of the first and second polarization layers means the direction of the partition forming each side of the tetragon that is identified when the tetragonal partition spacer is observed from the top.

In this specification, the term slow axis of polymer film substrate may mean, as any direction in the plane of the film, a direction having the largest in-plane refractive index. For example, when the polymer film substrate is a stretched retardation film substrate, the in-plane direction may be an in-plane direction formed by the MD (machine direction) and/or TD (transverse direction) directions of the polymer film substrate.

For example, the present application may be directed to a light modulation device where angles formed between the slow axis of each of the first and/or second polymer film substrates and each side of the spacer in the form of a tetragonal partition are in a range of −25 degrees to 25 degrees or in a range of 65 degrees to 115 degrees to each other. For example, when each of the first and/or second polymer film substrates is a stretched retardation film substrate, an in-plane direction (slow axis) formed by the MD and/or TD directions of each of the first and/or second polymer film substrates and each side of the spacer in the form of a tetragonal partition may be arranged such that the angle therebetween is in the range of −25 degrees to 25 degrees or in the range of 65 degrees to 115 degrees to each other. In another example, the angle formed between the slow axis of each of the first and/or second polymer film substrates and each side of the spacer in the form of a tetragonal partition may be in the range of −20 degrees to 20 degrees, in the range of −15 degrees to 15 degrees, in the range of −10 degrees to 10 degrees or in the range of −5 degrees to 5 degrees to each other, or may be in the range of 70 degrees to 110 degrees, in the range of 75 degrees to 105 degrees, in the range of 80 degrees to 100 degrees or in the range of 85 degrees to 95 degrees to each other.

By arranging the first and/or second polymer film substrates and the spacers in the form of a tetragonal partition as above, the present application may provide a light modulation device in which light leakage and/or haze in the black mode are more effectively controlled.

For example, the present application may be directed to a light modulation device that angles formed between the absorption axis of each of the first and/or second polarization layers and each side of the spacer in the form of a tetragonal partition are in the range of −25 degrees to 25 degrees or in the range of 65 degrees to 115 degrees to each other. In the light modulation device of the present application, it is possible by arranging the absorption axis of each of the first and/or second polarization layers and the spacer in the form of a tetragonal partition as above to provide a light modulation device that maximizes a desired effect.

The spacers in the form of a tetragonal partition in the present application may also be arranged so that each side is in the range of −25 degrees to 25 degrees or in the range of 65 degrees to 115 degrees with the absorption axis of each of the first and second polarization layers, and the slow axis of each of the first and second polymer films to each other. That is, in the above-described structure, by arranging the slow axis of the polymer film, the absorption axis of the polarization layer and each side of the spacer in the form of a tetragonal partition to have such a relationship, the cell gap is appropriately maintained and the light leakage and/or haze in the black mode is appropriately controlled while the adhesion between the upper and lower film substrates is excellent, whereby it is possible to provide a light modulation device capable of being used for various applications.

In the present application, the spacer may be manufactured by applying a usual method for manufacturing spacers in the form of a partition. Generally, the spacer in the form of a partition may be manufactured in a manner using a curable resin composition (for example, an imprinting method, etc.), and the spacer of the present application may also be manufactured in the above manner. Accordingly, the spacer of the present application may comprise a cured product of a curable resin composition. As the curable resin composition, known types applied for forming spacers may be applied without particular limitation. Such a resin composition is usually a heat-curable resin composition or a photocurable resin composition, such as an ultraviolet curable resin composition. As the heat-curable resin composition, for example, a silicone resin composition, a furan resin composition, a polyurethane resin composition, an epoxy resin composition, an amino resin composition, a phenol resin composition, a urea resin composition, a polyester resin composition or a melamine resin composition, and the like may be used, without being limited thereto. As the ultraviolet curable resin composition, a resin composition comprising, typically an acrylic polymer, for example, a polyester acrylate polymer, a polystyrene acrylate polymer, an epoxy acrylate polymer, a polyurethane acrylate polymer or a polybutadiene acrylate polymer, a silicone acrylate polymer or an alkyl acrylate polymer, and the like may be used, without being limited thereto. In one example, the spacer may be formed using an acrylic polymer, more specifically a polyester-based acrylate polymer, but is not limited thereto. In another example, it may also be formed using a silicone polymer, and when the spacer is formed using a silicone polymer, the silicone polymer remaining in the concave region of the spacer may serve as a vertical alignment film, so that as described below, no additional vertical alignment film may also be used on the substrate where the spacers are present. As the silicone polymer, a known polymer having bonds of silicon and oxygen (Si—O—Si) as a main axis may be used, and for example, polydimethylsiloxane (PDMS) may be used, without being limited thereto.

In the present application, the arrangement manners of the spacers in the form of a tetragonal partition, for example, the pitch, line width and height of the spacers and/or the area ratio in the first polymer film substrate or the second polymer film substrate, and the like may be appropriately designed within the range without impairing the object of the present application.

In the present application, the pitch of the spacer in the form of a tetragonal partition may be, for example, in a range of 50 μm to 1000 μm. In this specification, the term pitch means the length of each side of the tetragon identified when the spacer is observed from the top. In this specification, the matter that the spacer is observed from the top means that the spacer is observed parallel to the normal direction of the surface of the polymer film substrate formed with the spacer. When the lengths of the respective sides of the tetragon are all the same (i.e., when the tetragon is a square), the same length of the side can be defined as the pitch, and when the lengths of the respective sides are not the same (for example, when the tetragon is a rectangle), the arithmetic mean of the lengths of all sides can be defined as the pitch. In another example, the pitch of the spacer may be 100 μm or more, 150 μm or more, 200 μm or more, 250 μm or more, 300 μm or more, or 350 μm or more, or may be 900 μm or less, 850 μm or less, 800 μm or less, 750 μm or less, 700 μm or less, 650 μm or less, 600 μm or less, 550 μm or less, 500 μm or less, 450 μm or less, 400 μm or less, or 350 μm or less, but is not limited thereto.

In the present application, the line width of the spacer in the form of a tetragonal partition may be, for example, in a range of 1 μm to 50 μm. In this specification, the term line width means a dimension identified in the direction perpendicular to the longitudinal direction of the partition when the spacer is observed from the top. In another example, the line width of the spacer may be 5 μm or more, 10 μm or more, 15 μm or more, 20 μm or more, 25 μm or more, or may be 45 μm or less, 40 μm or less, 35 μm or less, or 30 μm or less, but is not limited thereto. At this time, when the spacer has no constant line width, the line width may be the measured maximum line width or minimum line width, or the average value of the maximum and minimum line widths.

In the present application, the height of the spacer in the form of a quadrangular column may be adjusted in consideration of the interval between the upper substrate and the lower substrate. For example, the height of the spacer may be in a range of 0.1 μm to 50 μm. Generally, the term height of spacer approximately matches the thickness (cell gap) of the light modulation layer, and means the dimension of the spacer measured in the normal direction of the surface of the polymer film substrate as mentioned above. In another example, the height of the spacer may be 1 μm or more, 2 μm or more, 3 μm or more, 4 μm or more, 5 μm or more, 6 μm or more, 7 μm or more, or 8 μm or more, or may be 45 μm or less, 40 μm or less, 35 μm or less, 30 μm or less, 25 μm or less, 20 μm or less, 15 μm or less, 10 μm or less, 9 μm or less, or 8 μm or less, but is not limited thereto. At this time, when the spacer has no constant height, the height may be the measured maximum height or minimum height, or the average value of the maximum and minimum heights.

In the present application, the area ratio of the spacer in the form of a tetragonal partition formed on the first polymer film substrate or the second polymer film substrate may be, for example, about 0.1% to 50%. In this specification, when the area of the polymer film substrate is A and the area where the spacer is formed is B, the term area ratio means a value obtained by multiplying the ratio of the area (B) where the spacer is formed among the area (A) of the polymer film substrate by 100, that is, 100×B/A. In another example, the area ratio of the spacer may be 1% or more, 2% or more, 3% or more, 4% or more, 5% or more, 6% or more, 7% or more, 8% or more, 9% or more, 10% or more, 11% or more, 12% or more, or 13% or more, or may be 45% or less, 40% or less, 35% or less, 30% or less, 25% or less, 20% or less, or 15% or less, but is not limited thereto. As the area ratio increases, the contact area between the spacer and the adhesive layer or the pressure-sensitive adhesive layer increases, whereby adhesion may increase, so that the area ratio may be designed in consideration of the desired adhesion.

In the present application, the ratio (P/W) of the pitch (P) to the line width (W) in the spacer in the form of a tetragonal partition may be in a range of 1 to 30. In another example, the ratio (P/W) may be 2 or more, 3 or more, 4 or more, 5 or more, 6 or more, 7 or more, 8 or more, 9 or more, 10 or more, 11 or more, 12 or more, or 13 or more, or may be 25 or less, 20 or less, 19 or less, 18 or less, 17 or less, 16 or less, 15 or less, or 14 or less.

In the present application, the ratio (W/H) of the line width (W) to the height (H) in the spacer in the form of a tetragonal partition may be in a range of 0.5 to 10. In another example, the ratio (W/H) may be 1 or more, 1.5 or more, 2 or more, 2.5 or more, or 3 or more, or may be 9 or less, 8 or less, 7 or less, 6 or less, 5 or less, or 4 or less.

By controlling the shape of the spacer in these ranges, it is possible to achieve the object of the present application while efficiently securing the orientation of the liquid crystal compound in the desired light modulation layer.

By controlling the shape, arrangement and/or disposition of the spacers as above, the present application may provide a light modulation device in which the cell gap is properly maintained and the light leakage and/or haze in the black mode are effectively controlled while the adhesion of the upper and lower film substrates is excellent.

In the present application, the term light modulation device may mean a device capable of switching between at least two or more different light states. Here, the different light states may mean states different from each other in at least one characteristic of transmittance, haze and color. The light modulation device of the present application may comprise at least a light modulation layer for switching as above. In one example, the light modulation layer may be a layer that generates polarization components.

The light modulation layer of the present application is a layer comprising at least a liquid crystal compound, which may mean a liquid crystal layer capable of controlling the oriented state of the liquid crystal compound through application of an external signal or the like. As the liquid crystal compound, any kind of liquid crystal compound can be used as long as its orientation direction can be changed by application of an external signal. For example, a nematic liquid crystal compound, a smectic liquid crystal compound or a cholesteric liquid crystal compound may be used as the liquid crystal compound. In addition, the liquid crystal compound may be, for example, a compound having no polymerizable group or crosslinkable group so that the orientation direction thereof may be changed by application of an external signal.

The light modulation layer of the present application may further comprise, for example, a dichroic dye together with the liquid crystal compound. In this specification, the term "dye" may mean a material capable of intensively absorbing and/or deforming light in at least a part or all of the ranges within a visible light region, for example, within a wavelength range of 400 nm to 700 nm, and the term "dichroic dye" may mean a material capable of anisotropic absorption of light in at least a part or all of the ranges of the visible light region. Such a dye is known, for example, as an azo dye or an anthraquinone dye, and the like, but is not limited thereto.

In one example, the light modulation layer is a liquid crystal layer comprising liquid crystal and dichroic dyes, which may be a so-called guest host liquid crystal layer (guest host liquid crystal cell). The term "GHLC layer" may mean a functional layer that dichroic dyes are arranged together depending on arrangement of liquid crystals to exhibit anisotropic light absorption characteristics with respect to an alignment direction of the dichroic dyes and the direction perpendicular to the alignment direction, respectively. For example, the dichroic dye is a substance whose absorption rate of light varies with a polarization direction, where if the absorption rate of light polarized in the long axis direction is large, it may be referred to as a p-type dye, and if the absorption rate of polarized light in the short axis direction is large, it may be referred to as an n-type dye. In one example, when a p-type dye is used, the polarized light vibrating in the long axis direction of the dye may be absorbed and the polarized light vibrating in the short axis direction of the dye may be less absorbed to be transmitted. Hereinafter, unless otherwise specified, the dichroic dye is assumed to be a p-type dye.

For example, the present application may be directed to a device designed so that by adjusting the arrangement of the liquid crystal compound in the light modulation layer, the initial orientation is vertical orientation and the vertically oriented state is capable of being changed to a horizontally oriented state by application of an external signal. Here, the initial orientation is an oriented state when no external signal is applied to the light modulation layer.

In this specification, the term vertical orientation is a state where the director of the light modulation layer or the director of the liquid crystal compound in the light modulation layer is arranged to be substantially perpendicular to the plane of the light modulation layer, and for example, the angle formed by the z-axis, which is the normal of the reference plane in the light modulation layer, and the director may be in a range of about 80 degrees to 100 degrees or 85 degrees to 95 degrees, or may be about 90 degrees or so. In addition, the term horizontal orientation may mean a state where the director of the light modulation layer or the director of the liquid crystal compound in the light modulation layer is arranged to be substantially parallel to the reference plane of the light modulation layer, and for example, the angle formed by the director and the reference plane of the light modulation layer may be in a range of about 0 degrees to 10 degrees or about 0 degrees to 5 degrees, or may be about 0 degrees or so.

In this specification, the term director of light modulation layer or director of liquid crystal compound may mean an optical axis or a slow axis of the light modulation layer. For example, the optical axis or the slow axis may mean a long axis direction when the liquid crystal molecules are in a rod shape, and may mean an axis in the normal direction of a discotic plane when the liquid crystal molecules are in a discotic shape, and when a plurality of liquid crystal compounds having different directors are included in the light modulation layer, it may mean a vector sum of the directors of the liquid crystal compounds.

In one example, the light modulation layer may be designed to implement a twist orientation mode. In this specification, the term twist orientation mode may mean a helical structure in which the directors of the liquid crystal compounds are twisted along an imaginary helical axis and simultaneously oriented to form a layer. The twist orientation mode may be implemented in the above-described vertical or horizontal orientation mode. For example, the vertical twist orientation mode is a layered state in which the individual liquid crystal compounds are twisted along the helical axis in a vertically oriented state and the horizontal twist orientation mode may mean a layered state in which the individual liquid crystal compounds are twisted along the helical axis in a horizontally oriented state.

In the twist orientation mode, the ratio (d/p) of the thickness (d) to the pitch (p) in the light modulation layer may be, for example, 1 or less. When the ratio (d/p) exceeds 1, a problem such as a finger domain may occur, and thus the range may be adjusted to the above range, if possible. In another example, the ratio (d/p) may be about 0.95 or less, about 0.9 or less, about 0.85 or less, about 0.8 or less, about 0.75 or less, about 0.7 or less, about 0.65 or less, about 0.6 or less, about 0.55 or less, about 0.5 or less, or about 0.4 or less, or may be about 0.01 or more, about 0.1 or more, about 0.15 or more, about 0.20 or more, about 0.25 or more, about 0.30 or more, or about 0.35 or more or so. Here, the thickness (d) of the light modulation layer may have the same meaning as the cell gap in the light modulation device.

The pitch (p) of the light modulation layer in the twist orientation mode may be measured by a measuring method using a wedge cell, and specifically, it may be measured by a method described in Simple method for accurate measurement of the cholesteric pitch using a "stripe-wedge Grandjean-Cano cell of D. Podolskyy, et al. (Liquid Crystals, Vol. 35, No. 7, Jul. 8, 2008, 789-791).

The orientation of the liquid crystal compound formed by the ratio of the thickness (d) and the pitch (p) as above can enable the orientation of the dichroic dye following it to effectively absorb the light to leak from the side upon vertical orientation, and the absorption of frontal light to be minimized upon horizontal orientation.

The light modulation layer may further comprise a so-called chiral dopant so that the light modulation layer can implement a twist mode. That is, the light modulation layer may further comprise a chiral dopant along with the liquid crystal compound and the dichroic dye.

The chiral dopant that can be included in the light modulation layer can be used without particular limitation as long as it can induce a desired rotation (twisting) without deteriorating the liquid crystallinity, for example, the nematic regularity. The chiral dopant for inducing rotation in the liquid crystal molecules needs to include at least chirality in the molecular structure. The chiral dopant may be exemplified by, for example, a compound having one or two or more asymmetric carbons, a compound having an asymmetric point on a heteroatom, such as a chiral amine or a chiral sulfoxide, or a compound having axially asymmetric and optically active sites such as cumulene or binaphthol. The chiral dopant may be, for example, a low molecular weight compound having a molecular weight of 1,500 or less. As the chiral dopant, commercially available chiral nematic liquid crystals, for example, chiral dopant liquid crystal S811 commercially available from Merck Co., Ltd. or BASF's LC756 may be applied.

The application ratio of the chiral dopant is not particularly limited as long as it can achieve the desired ratio (d/p). Generally, the content (wt %) of the chiral dopant is calculated by an equation of 100/(HTP (helical twisting power)× pitch (nm)), which may be selected in an appropriate ratio in consideration of the desired pitch (p).

The light modulation layer may comprise a liquid crystal compound whose dielectric constant anisotropy is negative, or the light modulation layer may exhibit the dielectric constant anisotropy mentioned above. The absolute value of the dielectric constant anisotropy can be appropriately selected in consideration of the object of the present application. The term "dielectric constant anisotropy (Δε)" may mean a difference (ε//−ε⊥) between the horizontal dielectric constant (ε//) and the vertical dielectric constant (ε⊥). In this specification, the term horizontal dielectric constant (ε//) means a dielectric constant value measured along the direction of an electric field in a state where a voltage is applied so that the director of the liquid crystal and the direction of the electric field by the applied voltage are substantially horizontal, and the vertical dielectric constant (ε⊥) means a dielectric constant value measured along the direction of an electric field in a state where a voltage is applied so that the director of the liquid crystal and the direction of the electric field by the applied voltage are substantially perpendicular.

The liquid crystal layer may comprise a liquid crystal compound having refractive index anisotropy (Δn) in a range of about 0.04 to 0.15, or the liquid crystal layer may exhibit the aforementioned refractive index anisotropy. The refractive index anisotropy (Δn) referred to in the present application is a difference (ne-no) between an extraordinary refractive index (ne) and an ordinary refractive index (no), which can be confirmed using an Abbe refractometer, and the specific manner is in accordance with the method disclosed in the following examples. In another example, the refractive index anisotropy (Δn) may be about 0.14 or less, 0.13 or less, 0.12 or less, 0.11 or less, or 0.1 or less, or may be 0.05 or more, 0.06 or more, 0.07 or more, 0.08 or more, or 0.09 or more.

The thickness of the light modulation layer of the present application may be appropriately selected in consideration of the object of the present application. In one example, the thickness of the light modulation layer may be about 20 μm or less. By controlling the thickness in this way, a device having a large transmittance difference in the transparent mode and the black mode, that is, a device having excellent transmittance-variable characteristics can be implemented. In another example, the thickness may be about 14 μm or less, 13 μm or less, 12 μm or less, 11 μm or less, 10 μm or less, or 9 μm or less, or may be 1 μm or more, 2 μm or more, 3 μm or more, 4 μm or more, 5 μm or more, 6 μm or more, or 7 μm or more, but is not limited thereto.

In the light modulation device of the present application, for example, a first polymer film substrate and a second polymer film substrate may be disposed on both sides of the light modulation layer.

Each of the first and second polymer film substrates may have an in-plane phase difference of, for example, 500 nm or more for light having a wavelength of 550 nm. In another example, it may be 1000 nm or more, 2000 nm or more, 3000 nm or more, 4000 nm or more, 5000 nm or more, 6000 nm or more, 7000 nm or more, 8000 nm or more, 9000 nm or more, or 10000 nm or more, or may be 50000 nm or less, 40000 nm or less, 30000 nm or less, 20000 nm or less, or 15000 nm or less, but is not limited thereto.

In this specification, the in-plane phase difference may mean a value calculated by Equation 1 below.

$$Rin = d \times (nx - ny) \quad \text{[Equation 1]}$$

In Equation 1, Rin is the in-plane phase difference, d is the thickness of the polymer film substrate, nx is the refractive index in the slow axis direction of the polymer film substrate, and ny is the refractive index in the fast axis direction, which is the refractive index in the planar direction orthogonal to the slow axis direction.

The film having high retardation as above is known in the art, and such a film exhibits high asymmetry even in mechanical properties by high stretching or the like during preparation procedures as well as optically large anisotropy. A representative example of the retardation film known in the art may include a polyester film such as a PET (poly (ethylene terephthalate)) film, and the like.

In the light modulation device of the present application, the first and second polymer film substrates may be included in the device so that the slow axes of the first and second polymer film substrates have a specific positional relationship. In one example, the first and second polymer film substrates may be disposed so that their slow axes are horizontal.

By arranging the first and second polymer film substrates having such an in-plane phase difference so that the slow axes of the polymer film substrates have the above range, it is possible to provide a light modulation device in which the light leakage is effectively controlled while exhibiting excellent transmittance-variable effects through the combination of the above-described spacer in the form of a tetragonal partition, and the like.

The first and second polymer film substrates of the present application may each comprise, for example, first and/or second polarization layers on one side of the polymer film substrate. In this specification, the polarization layer may mean an element that converts natural or non-polarized light into polarized light. In one example, the polarization layer may be a linear polarization layer. In this specification, the linear polarization layer means a case where the selectively transmitted light is linearly polarized light vibrating in any one direction, and the selectively absorbed or reflected light is linearly polarized light vibrating in a direction orthogonal to the vibration direction of the linearly polarized light. That is, the linear polarizer may have a transmission axis and an absorption axis or a reflection axis orthogonal to the plane direction.

The polarization layer may be an absorbing polarization layer or a reflecting polarization layer. As the absorbing polarization layer, for example, a polarization layer in which iodine is dyed on a polymeric stretched film such as a PVA (PVA means polyvinyl alcohol in this specification) stretched film or a guest-host type polarization layer in which liquid crystals polymerized in the oriented state are set as a host and an anisotropic dye arranged according to the orientation of the liquid crystals is set as a guest may be used, without being limited thereto. As the reflecting polarization layer, for example, a reflecting polarization layer known as a DBEF (dual brightness enhancement film) or a reflecting polarization layer formed by coating a liquid crystal compound such as LLC (lyotropic liquid crystal) may be used, without being limited thereto.

In one example, the absorption axes of the first polarization layer and the second polarization layer may be disposed to be parallel or perpendicular to each other. The light modulation device of the present application controls light leakage and haze, especially in the black mode through such an arrangement, whereby it is possible to provide a light modulation device capable of effectively implementing a dark state.

For example, the light modulation device of the present application may have transmittance of 60% or less in the black mode. In this specification, the transmittance may mean the transmittance measured according to Evaluation Example 1 below. In another example, the transmittance in the black mode may be 55% or less, 50% or less, 45% or less, 40% or less, 35% or less, 30% or less, 25% or less, 20% or less, 15% or less, 10% or less, 5% or less, 4% or less, 3% or less, 2% or less, 1% or less, 0.9% or less, 0.8% or less, 0.7% or less, 0.6% or less, 0.5% or less, 0.4% or less, 0.39% or less, 0.38% or less, 0.37% or less, 0.36% or less, 0.35% or less, 0.34% or less, 0.33% or less, 0.32% or less, 0.31% or less, 0.30% or less, 0.29% or less, or 0.28% or less. In the black mode, the lower the transmittance, the more advantageous, whereby the lower limit of the transmittance in the black mode state is not particularly limited, and in one example, the lower limit of the transmittance in the black mode state may be about 0%.

For example, the light modulation device of the present application may have transmittance of 20% or more in a transparent mode. In this specification, the transmittance may mean the transmittance measured according to Evaluation Example 1 below. In another example, the transmittance in the transparent mode may be about 21% or more, 22% or more, 23% or more, 24% or more, 25% or more, 26% or more, or 27% or more or so. The higher the transmittance in the transmittance mode, the more advantageous, whereby the upper limit of the transmittance in the transmittance mode state is not particularly limited, and in one example, the upper limit of the transmittance in the transmittance mode state may be about 100%.

In the light modulation device of the present application, for example, the transmittance difference in the transparent mode and black mode states may be 15% or more, 16% or more, 17% or more, 18% or more, 19% or more, 20% or more, 21% or more, 22% or more, 23% or more, 24% or more, 25% or more, 26% or more, or 27% or more, or may be 90% or less, 85% or less, 80% or less, 75% or less, 70% or less, 65% or less, 60% or less, 55% or less, 50% or less, 45% or less, 40% or less, 35% or less, or 30% or less.

The transmittance may be, for example, linear light transmittance. The linear light transmittance may be a percentage of the ratio of the light transmitted in the same direction as the incident direction to the light incident on the light modulation device. For example, if the device is in the form of a film or sheet, the percentage of the light transmitted through the device in the direction parallel to the normal direction among the light incident in a direction parallel to the normal direction of the film or sheet surface may be defined as the transmittance.

The transmittance or reflectance may be each transmittance or reflectance for any one wavelength in the visible light region, for example, any one wavelength in a range of about 400 nm to 700 nm or about 380 nm to 780 nm, or transmittance or reflectance for the entire visible light region, maximum or minimum transmittance or reflectance among the transmittance or reflectance for the entire visible light region, or an average value of the transmittance or an average value of the reflectance in the visible light region. In another example, the transmittance may be transmittance for light having a wavelength of about 550 nm.

The light modulation device of the present application may also have haze of about 60% or less in the black mode. In another example, it may be about 55% or less, about 50% or less, or about 45% or less, or may be about 1% or more, 5% or more, 10% or more, 15% or more, 20% or more, 25% or more, 30% or more, 35% or more, or 40% or more. In addition, the light modulation device of the present application may have, for example, haze in the transparent mode in a range of about 0.1% to 10%. In another example, it may be about 0.5% or more, 1.0% or more, 1.5% or more, 1.6% or more, 1.7% or more, 1.8% or more, or 1.9% or more, or may be 9% or less, 8% or less, 7% or less, 6% or less, 5% or less, 4% or less, 3% or less, or 2% or less.

In the present application, for example, a liquid crystal alignment film may be formed on the first surface of the second polymer film substrate. The liquid crystal alignment film may be used to determine the initial orientation of the liquid crystals in the light modulation layer. At this time, the type of the applied liquid crystal alignment film is not particularly limited, which may be, for example, a known rubbing alignment film or a photo-alignment film.

The orientation direction may be the rubbing direction in the case of the rubbing alignment film and the direction of irradiated polarization light in the case of the photo-alignment film, where such an orientation direction may be confirmed by a detection method using a linear polarization layer. For example, in the case of being the light modulation layer of the present application in a twisted orientation mode such as a TN (twisted nematic) mode, if a linear polarization layer is disposed on one side and the transmittance is measured while changing the absorption axis of the polarization layer, the transmittance tends to be low when the absorption axis or the transmission axis coincides with the orientation direction of the liquid crystal alignment film, where the orientation direction may be confirmed through a simulation reflecting the refractive index anisotropy of the applied liquid crystal compound. The method of confirming the orientation direction according to the mode of the light modulation layer of the present application is known.

In the light modulation device of the present application, for example, an adhesive layer or a pressure-sensitive adhesive layer may be formed on one side of the first polymer film substrate. In one example, the adhesive layer or pressure-sensitive adhesive layer may comprise an adhesive or pressure-sensitive adhesive having vertical orientation force. In this specification, the term adhesive or pressure-sensitive adhesive having vertical orientation force may mean a material having both adhesion (or cohesion) and vertical orientation force to liquid crystal molecules.

In one example, the adhesive or pressure-sensitive adhesive having vertical orientation force may be formed on at least one of the surfaces of the first polymer film substrate and the surface of the second polymer film substrate. According to one example of the present application, an adhesive or pressure-sensitive adhesive having vertical orientation force may be present on one surface of the first polymer film substrate, and a liquid crystal alignment film may be formed on one side of the second polymer film substrate.

In the present application, as the adhesive or pressure-sensitive adhesive having vertical orientation force, for example, a silicone adhesive may be used. As the silicone adhesive, a cured product of a composition containing a curable silicone compound may be used. Since the curable silicone compound may exhibit vertical orientation ability in terms of its surface characteristics, an appropriate type may be selected from known silicone adhesives or pressure-sensitive adhesives. For example, a heat-curable silicone compound or an ultraviolet curing silicone compound may be used.

In one example of the present application, the curable silicone compound is an addition-curing silicone compound, which may comprise (1) an organopolysiloxane containing two or more alkenyl groups in the molecule, and (2) an organopolysiloxane containing two or more silicon-bonded hydrogen atoms in the molecule. Such a silicone compound may form a cured product by an addition reaction, for example, in the presence of a catalyst to be described below.

Here, the (1) organopolysiloxane may comprise, as a main component constituting the silicone cured product, at least two alkenyl groups in one molecule. At this time, a specific example of the alkenyl group may include a vinyl group, an allyl group, a butenyl group, a pentenyl group, a hexenyl group or a heptenyl group, and the like, and preferably a vinyl group of the foregoing, but is not limited thereto. In the (1) organopolysiloxane, the bonding position of the alkenyl group as described above is not particularly limited. For example, the alkenyl group may be bonded to the end of the molecular chain and/or to the side chain of the molecular chain. In addition, in the (1) ornagopolysiloxane, the type of the substituent that may be included in addition to the above-described alkenyl may include an alkyl group such as a methyl group, an ethyl group, a propyl group, a butyl group, a pentyl group, a hexyl group or a heptyl group; an aryl group such as a phenyl group, a tolyl group, a xylyl group or a naphthyl group; an aralkyl group such as a benzyl group or a phenentyl group; a halogen-substituted alkyl group such as a chloromethyl group, a 3-chloropropyl group or a 3,3,3-trifluoropropyl group, and the like, and preferably a methyl group or a phenyl group of the foregoing, but is not limited thereto.

The molecular structure of the (1) organopolysiloxane is not particularly limited, which may also have any shape, such as linear, branched, cyclic, reticulated or linear with partially branched. In the present application, it is particularly preferable to have a linear molecular structure among such molecular structures, but is not limited thereto. Meanwhile, in the present invention, it is preferable to use an organopolysiloxane containing an aromatic group such as an aryl group or an aralkyl group in the molecular structure as the (1) organopolysiloxane in terms of the hardness and refractive index of the cured product, without being necessarily limited thereto.

A more specific example of the (1) organopolysiloxane that can be used in the present application may include a dimethylsiloxane-methylvinylsiloxane copolymer blocking with trimethylsiloxane groups at both ends of the molecular chain, a methylvinylpolysiloxane blocking with trimethylsiloxane groups at both ends of the molecular chain, a dimethylsiloxane-methylvinylsiloxane-methylphenylsiloxane copolymer blocking with trimethylsiloxane groups at both ends of the molecular chain, a dimethylpolysiloxane blocking with dimethylvinylsiloxane groups at both ends of the molecular chain, a methyl vinylpolysiloxane blocking with dimethylvinylsiloxane groups at both ends of the molecular chain, a dimethyl siloxane-methylvinyl siloxane copolymer blocking with dimethylvinylsiloxane groups at both ends of the molecular chain, a dimethylsiloxane-methylvinylsiloxane-methylphenylsiloxane copolymer blocking with dimethylvinylsiloxane groups at both ends of the molecular chain, an organopolysiloxane copolymer comprising a siloxane unit represented by $R^1_2SiO_{1/2}$ and a siloxane unit represented by $R^1_2R_2SiO_{1/2}$ and a siloxane unit represented by $SiO_{4/2}$, an organopolysiloxane copolymer comprising a siloxane unit represented by $R^1_2R_2SiO_{1/2}$ and a siloxane unit represented by $SiO_{4/2}$.

an organopolysiloxane copolymer comprising a siloxane unit represented by $R^1R_2SiO_{2/2}$ and a siloxane unit represented by $R^1SiO_{3/2}$ or a siloxane unit represented by $R^2SiO_{3/2}$, and a mixture of two or more of the foregoing, but is not limited thereto. Here, $R^1$ is a hydrocarbon group other than an alkenyl group, specifically, an alkyl group such as a methyl group, an ethyl group, a propyl group, a butyl group, a pentyl group, a hexyl group or a heptyl group; an aryl group such as a phenyl group, a tolyl group, a xylyl group or a naphthyl group; an aralkyl group such as a benzyl group or a phenentyl group; a halogen-substituted alkyl group such as a chloromethyl group, a 3-chloropropyl group, or a 3,3,3-trifluoropropyl group, and the like. In addition, here, $R^2$ is an alkenyl group, which may be, specifically, a vinyl group, an allyl group, a butenyl group, a pentenyl group, a hexenyl group or a heptenyl group, and the like.

In one aspect of the present invention, the (1) organopolysiloxane may have a viscosity of 50 to 500,000 CP (centipoise), and preferably 400 to 100,000 CP, at 25° C. If the viscosity is less than 50 CP, the mechanical strength of the cured product of the silicone compound may be lowered, and if it exceeds 500,000 CP, the handling property or workability may be lowered.

In the addition-curing silicone compound, the (2) organopolysiloxane may serve to crosslink the (1) organopolysiloxane. In the (2) organopolysiloxane, the bonding position of the hydrogen atom is not particularly limited, which may be, for example, bonded to the end and/or side chain of the molecular chain. Also, in the (2) organopolysiloxane, the kind of substituents that may be included in addition to the silicon-bonded hydrogen atom is not particularly limited, which may include, for example, an alkyl group, an aryl group, an aralkyl group or a halogen-substituted alkyl group, and the like as mentioned in the (1) organopolysiloxane, and among these, a methyl group or a phenyl group is preferred, but is not limited thereto.

Meanwhile, the molecular structure of the (2) organopolysiloxane is not particularly limited, and may also have any shape, such as linear, branched, cyclic, reticulated, or linear with partially branched. In the present application, it is particularly preferable to have a linear molecular structure among such molecular structures, but is not limited thereto.

A more specific example of the (2) organopolysiloxane that can be used in the present invention may include a methylhydrogenpolysiloxane blocking with trimethylsiloxane groups at both ends of the molecular chain, a dimethylsiloxane-methylhydrogen copolymer blocking with trimethylsiloxane groups at both ends of the molecular chain, a dimethylsiloxane-methylhydrogensiloxane-methylphenylsiloxane copolymer blocking with trimethylsiloxane groups at both ends of the molecular chain, a dimethylpolysiloxane blocking with dimethylhydrogensiloxane groups at both ends of the molecular chain, a dimethyl siloxane-methylphenylsiloxane copolymer blocking with dimethylhydrogensiloxane groups at both ends of the molecular chain, a methylphenylpolysiloxane blocking with dimethylhydrogensiloxane groups at both ends of the molecular chain, an organopolysiloxane copolymer comprising a siloxane unit represented by $R^1_3SiO_{1/2}$, a siloxane unit represented by $R^1_2HSiO_{1/2}$ and a siloxane unit represented by $SiO_{4/2}$, an organopolysiloxane copolymer comprising a siloxane unit represented by $R^1_2HSiO_{1/2}$ and a siloxane unit represented by $SiO_{4/2}$, an organopolysiloxane copolymer comprising a siloxane unit represented by $R^1HSiO_{2/2}$ and a siloxane unit represented by $R^1SiO_{3/2}$ or a siloxane unit represented by $HSiO_{3/2}$ and a mixture of two or more of the foregoing, but is not limited thereto. Here, $R^1$ is a hydrocarbon group other than an alkenyl group, which may be, specifically, an alkyl group such as a methyl group, an ethyl group, a propyl group, a butyl group, a pentyl group, a hexyl group or a heptyl group; an aryl group such as a phenyl group, a tolyl group, a xylyl group or a naphthyl group; an aralkyl group such as a benzyl group or a phenentyl group; a halogen-substituted alkyl group such as a chloromethyl group, a 3-chloropropyl group or a 3,3,3-trifluoropropyl group, and the like.

In the present application, for example, the (2) organopolysiloxane may have a viscosity of 1 to 500,000 CP (centipoise), preferably 5 to 100,000 CP, at 25° C. If the viscosity is less than 1 CP, the mechanical strength of the cured product of the silicone compound may be lowered, and if it exceeds 500,000 CP, the handling property or workability may be lowered.

In the present application, the content of the (2) organopolysiloxane is not particularly limited as long as it is included to the extent that appropriate curing can be performed. For example, the (2) organopolysiloxane may be contained in an amount of 0.5 to 10 silicon-bonded hydrogen atoms per one alkenyl group contained in the (1) organopolysiloxane as described above. If the number of silicon atom-bonded hydrogen atoms is less than 0.5, the curing of the curable silicone compound may be insufficiently performed, and if it exceeds 10, the heat resistance of the cured product may decrease. Meanwhile, in the present invention, from the viewpoint of hardness and refractive index of the cured product, it is preferable that the (2) organopolysiloxane containing an aromatic group such as an aryl group or aralkyl group in the molecular structure is used as the (2) organopolysiloxane, without being necessarily limited thereto.

In the present application, the addition-curing silicone compound may further comprise platinum or a platinum compound as a catalyst for curing. A specific example of such platinum or platinum compounds may include platinum fine powder, platinum black, platinum-supported silica fine powder, platinum-supported activated carbon, chlorinated platinum acid, platinum tetrachloride, an alcohol solution of chlorinated platinum acid, a complex of platinum and an olefin, a complex of platinum and an alkenylsiloxane such as 1,1,3,3-tetramethyl-1,3-divinyldisiloxane, and thermoplastic resin fine powder (polystyrene resin, nylon resin, polycarbonate resin, silicone resin, etc.) with a particle diameter of less than 10 which contains these platinum or platinum compounds, but is not limited thereto.

The content of the above-described catalyst in the addition-curing silicone compound of the present invention is not particularly limited, which may be included in an amount of, for example, 0.1 to 500 ppm, preferably 1 to 50 ppm, in a weight unit of the total compound. If the content of the catalyst is less than 0.1 ppm, the curability of the composition may be deteriorated, and if the content of the catalyst exceeds 500 ppm, the economic efficiency may decrease.

In the present application, the addition-curing silicone compound may further comprise, from the viewpoint of improving storage stability, handling properties and workability, a curing inhibitor such as an alkyne alcohol of 3-methyl-1-butyn-3-ol, 3,5-dimethyl-1-hexin-3-ol, phenyl-butynol or the like; an enyne compound of 3-methyl-3-pentene-1-yne, 3,5-dimethyl-3-hexene-1-yne or the like; 1,2,5,7-tetramethyl-1,3,5,7-tetravinylcyclotetrasiloxane, 1,3,5,7-tetramethyl-1,3,5,7-tetrahexenylcyclotetrasil oxane and benzotriazole. The content of the curing inhibitor may be appropriately selected within a range that does not impair the object of the invention, which may be included in a range of, for example, 10 ppm to 50,000 ppm on the basis of weight.

In the present application, the silicone compound may comprise, as a condensation-curing silicone compound, for example, (a) an alkoxy group-containing siloxane polymer; and (b) a hydroxyl group-containing siloxane polymer.

The (a) siloxane polymer that can be used in the present invention may be, for example, a compound represented by the following formula 1.

[Formula 1]

In Formula above, $R^1$ and $R^2$ each independently represent a hydrogen atom or a substituted or unsubstituted monovalent hydrocarbon group, $R^3$ represents an alkyl group, where when a plurality of $R^1$, $R^2$ and $R^3$ are present, they each may be the same or different from each other, and a and b each independently represent a number of 0 or more and less than 1, a+b represents a number of more than 0 and less than 2, c represents a number of more than 0 and less than 2, d represents a number of more than 0 and less than 4, and a+b+c×2+d is 4.

In the present invention, the siloxane polymer represented by Formula 1 above may have a weight average molecular weight in terms of polystyrene of 1,000 to 100,000, preferably 1,000 to 80,000, more preferably 1,500 to 70,000, as measured by gel permeation chromatography. The weight average molecular weight of the (a) siloxane polymer is within the above range, whereby it is possible to obtain a good cured product without causing defects such as cracks on formation of the cured silicone product.

In the definition of Formula 1 above, the monovalent hydrocarbon group may be, for example, an alkyl group having 1 to 8 carbon atoms, a phenyl group, a benzyl group or a tolyl group, and the like, where the alkyl group having 1 to 8 carbon atoms may be a methyl group, an ethyl group, a propyl group, an isopropyl group, a butyl group, a pentyl group, a hexyl group, a heptyl group or an octyl group, and the like. Also, in the definition of Formula 1 above, the monovalent hydrocarbon group may be substituted with a known substituent such as a halogen, an amino group, a mercapto group, an isocyanate group, a glycidyl group, a glycidoxy group or a ureido group. In addition, in the definition of Formula 1 above, an example of the alkyl group of $R^3$ may include a methyl group, an ethyl group, a propyl group, an isopropyl group or a butyl group, and the like. Among these alkyl groups, a methyl group or an ethyl group, and the like is preferable, but is not limited thereto.

In the present invention, it is preferable to use a branched or tertiary crosslinked siloxane polymer among the polymers of Formula 1 above. Furthermore, in this (a) siloxane polymer, a hydroxyl group may remain within a range that does not impair the object of the present invention, specifically within a range that does not inhibit the dealcoholization reaction.

The (a) siloxane polymer as above may be produced, for example, by hydrolyzing and condensing a polyfunctional alkoxysilane or a polyfunctional chlorosilane, and the like. An average technician in this field can easily select an appropriate polyfunctional alkoxysilane or chlorosilane depending on the desired (a) siloxane polymer, and can also easily control the conditions of the hydrolysis and condensation reactions using the same. Meanwhile, in the production of the (a) siloxane polymer, an appropriate monofunctional alkoxy silane may also be used in combination depending on the purpose.

As the (a) siloxane polymer as above, for example, a commercially available organosiloxane polymer such as Shin-Etsu Silicone's X40-9220 or X40-9225, or GE Toray Silicone's XR31-B1410, XR31-B0270 or XR31-B2733 may be used. Meanwhile, in the present invention, from the viewpoint of the hardness and refractive index of the cured product, it is preferable to use, as the (a) organopolysiloxane, (a) an organopolysiloxane containing an aromatic group, such as an aryl group or an aralkyl group, in the molecular structure, without being necessarily limited thereto. Meanwhile, as the (b) hydroxyl group-containing siloxane polymer contained in the condensation-curing silicone compound, for example, a compound represented by the following formula 2 may be used.

[Formula 2]

In Formula 2 above, $R^4$ and $R^5$ each independently represent a hydrogen atom or a substituted or unsubstituted monovalent hydrocarbon group, where when a plurality of $R^4$ and $R^5$ are present, they may be the same or different from each other, and n represents an integer of 5 to 2,000.

In the definition of Formula 2 above, the specific type of the monovalent hydrocarbon group may include, for example, the same hydrocarbon group as the case of Formula 1 as described above.

In the present invention, the siloxane polymer of Formula 2 above may have a weight average molecular weight in terms of polystyrene of 500 to 100,000, preferably 1,000 to 80,000, more preferably 1,500 to 70,000, as measured by gel permeation chromatography. As the (b) siloxane polymer has a weight average molecular weight in the above range, a good cured product may be obtained without causing defects such as cracks upon formation of the cured silicone product.

The (b) siloxane polymer as above may be produced, for example, by hydrolyzing and condensing dialkoxysilane and/or dichlorosilane, and the like. An average technician in this field can easily select an appropriate dialkoxysilane or dichlorosilane according to the desired (b) siloxane polymer, and can also easily control the conditions of the hydrolysis and condensation reactions using the same. As the (b) siloxane polymer as above, a commercially available bifunctional organosiloxane polymer, such as GE Toray Silicone's XC96-723, YF-3800 or YF-3804, and the like may be used. Meanwhile, in the present invention, from the viewpoint of hardness and refractive index of the cured product, it is preferable to use, as the (1) organopolysiloxane, (1) an organopolysiloxane containing an aromatic group, such as an aryl group or an aralkyl group, in the molecular structure, without being necessarily limited thereto.

The type of the adhesive or pressure-sensitive adhesive having vertical orientation force is not particularly limited, which may be appropriately selected according to the intended use, where for example, a solid adhesive (or pressure-sensitive adhesive), a semi-solid adhesive (or pressure-sensitive adhesive), an elastic adhesive (or pressure-sensitive adhesive) or a liquid adhesive (or pressure-sensitive adhesive) may be appropriately selected and used. The solid adhesive (or pressure-sensitive adhesive), semi-solid adhesive (or pressure-sensitive adhesive) or elastic adhesive (or pressure-sensitive adhesive) may be referred to as a so-called pressure-sensitive adhesive (PSA), and may be cured before an adhesive (or pressure-sensitive adhesive) target is bonded. The liquid adhesive may be referred to as a so-called optical clear resin (OCR), and may be cured after an adhesive (or pressure-sensitive adhesive) target is bonded. In the present application, for example, as the PSA-type adhesive or pressure-sensitive adhesive having vertical orientation force, a polydimethyl siloxane adhesive (or pressure-sensitive adhesive) or a polymethylvinyl siloxane adhesive (or pressure-sensitive adhesive) may be used, and as the OCR-type adhesive (or pressure-sensitive adhesive) having vertical orientation force, an alkoxysilicone adhesive (or pressure-sensitive adhesive) may be used, without being limited thereto.

By comprising the adhesive layer or the pressure-sensitive adhesive layer having such properties under the arrangement as above, it is possible to provide a light modulation device effectively controlling light leakage and/or haze, especially in a black mode, thereby being capable of exhibiting excellent optical properties, while having excellent adhesive force.

In one example of the present application, when the adhesive layer or the pressure-sensitive adhesive layer having vertical orientation force as above is formed on one side of the first polymer film substrate, no liquid crystal alignment film may also be formed on the first polymer film substrate.

As such, the orientation of the known vertical alignment film and the liquid crystal compound formed by the adhesive or pressure-sensitive adhesive having vertical orientation ability can enable to effectively suppress light leakage upon vertical orientation and to minimize absorption of frontal light upon horizontal orientation.

Figure 2:
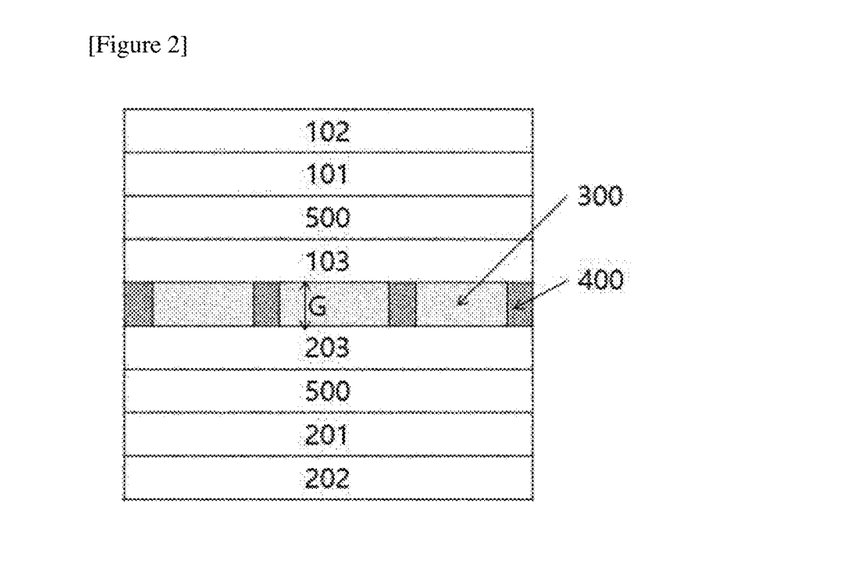

The light modulation device of the present application may further comprise a conductive layer on one side of each of the first and second polymer film substrates, as long as the effect of the present application is not obstructed. In one example, as shown in FIG. 2, conductive layers (500) may each be formed between the adhesive layer (or pressure-sensitive adhesive layer) (103) and the first polymer film substrate (101) and between the liquid crystal alignment film (203) and the second polymer film substrate (201).

The conductive layer may transfer an appropriate electric field to the light modulation layer to switch the alignment of the light modulation layer. The direction of the electric field may be a vertical or horizontal direction, for example, the thickness direction or the plane direction of the light modulation layer.

The conductive layer may be, for example, a transparent conductive layer, and the transparent conductive layer may be formed by depositing, for example, a conductive polymer, a conductive metal, a conductive nanowire or a metal oxide such as ITO (indium tin oxide), and the like. Besides, various materials and formation methods capable of forming the transparent conductive layer are known, which can be applied without limitation.

As other configurations, known configurations such as a hard coating layer, an antireflection layer and a layer containing a dye having an NIR (near-infrared) cut function may be further included, as long as the effect of the present application is not obstructed.

Such a light modulation device can be applied to various applications. The applicable application by the light modulation device can be exemplified by openings in closed spaces including buildings, containers or vehicles, such as windows or sunroofs, or eyewear, and the like, or windows and doors, light shielding plates of OLEDs (organic light emitting devices), and the like. Here, in the range of eyewear, all eyewear formed so that an observer can observe the outside through lenses, such as general glasses, sunglasses, sports goggles or helmets, or a wearable device such as an instrument for experiencing virtual reality or augmented reality can be included.

A typical application capable of being applied by the light modulation device of the present application may include a vehicle sunroof.

In one example, the light modulation device per se may be a vehicle sunroof. For example, in a vehicle comprising a vehicle body in which at least one or more openings are formed, the light modulation device or the vehicle sunroof mounted on the opening may be mounted and used.

The sunroof is a fixed or operating (venting or sliding) opening on a ceiling of a vehicle, which may mean collectively a device that can function to allow light or fresh air to enter the interior of the vehicle. In the present application, the method of operating the sunroof is not particularly limited, and for example, it can be manually operated or driven by a motor, where the shape, size or style of the sunroof may be appropriately selected according to the intended use. For example, according to the operation method, the sunroof may be exemplified by a pop-up type sunroof, a spoiler (tile & slide) type sunroof, an inbuilt type sunroof, a folding type sunroof, a top-mounted type sunroof, a panoramic roof system type sunroof, a removable roof panels (t-tops or targa roofts) type sunroof or a solar type sunroof, and the like, but is not limited thereto.

An exemplary sunroof of the present application may comprise the light modulation device of the present application, and in this case, as for the details of the light modulation device, the contents described in the items of the light modulation device may be equally applied.

Advantageous Effects

In the present application, the present application can provide a light modulation device which properly maintains a cell gap by properly controlling the shape and arrangement of spacers and the like, and is applicable for various applications by effectively controlling omnidirectional light leakage in a black mode, while having excellent optical properties, including transmittance-variable characteristics and haze characteristics, and the like.

BEST MODE

Hereinafter, the present application will be described in detail through examples, but the scope of the present application is not limited by the following examples.

Evaluation Example 1: Evaluation of Transmittance and Haze

While an AC power was connected to each of conductive layers (500 in FIG. 2) of an upper substrate and a lower substrate, and driven, transmittance and haze depending on the applied voltage were measured using a haze meter (NDH5000SP, Sekos) according to ASTM D1003 standard.

Specifically, when light with a wavelength of 380 nm to 780 nm is incident on the measurement object in the integrating sphere, the incident light is divided into diffused light (DT, sum of the diffused and emitted light) and straight light (PT, light emitted from the front direction excluding diffused light) by the measurement object. The diffused light and the straight light can each be measured by condensing them on the light receiving element in the integrating sphere. That is, by the above process, the total transmitted light (TT) is defined as the sum (DT+PT) of the diffused light (DT) and the straight light (PT), and the haze is defined as the percentage (100×(DT/TT)) of the diffused light (DT) to the total transmitted light (TT). The total transmitted light means total transmittance.

Evaluation Example 2: In-Plane Phase Difference Evaluation of Polymer Film Substrate The in-plane phase difference (Rin) of the polymer film substrate was measured using Agilent's UV/VIS spectroscope 8453 equipment (based on a wavelength of 550 nm). Two sheets of polarizers were installed in the UV/VIS spectroscope so that their transmission axes were orthogonal to each other, and a polymer film substrate was positioned between the two sheets of polarizers so that its slow axis formed 45 degrees with the transmission axes of the two polarizers, respectively, and then the transmittance according to wavelengths was measured. The phase retardation order of each peak was obtained from the transmittance graph according to wavelengths. A waveform in the transmittance graph according to wavelengths satisfies Equation A below, and the maximum peak (Tmax) condition in the sine waveform satisfies Equation B below. In the case of λmax in Equation A, since the T of Equation A and the T of Equation B are the same, the equations are expanded. As the equations are also expanded for n+1, n+2 and n+3, arranged for n and n+1 equations to eliminate R, and arranged for n into λn and λn+1 equations, the following Equation C is derived. Since n and λ can be known based on the fact that T of Equation A and T of Equation B are the same, R for each of λn, λn+1, λn+2 and λn+3 is obtained. A linear trend line of R values according to wavelengths for 4 points is obtained and the R value for the equation 550 nm is calculated. The function of the linear trend line is Y=ax+b, where a and b are constants. The Y value when 550 nm has been substituted for x of the function is the Rin value for light having a wavelength of 550 nm.

$T=\sin 2[(2\pi R/\lambda)]$ [Equation A]

$T=\sin 2[((2n+1)\pi/2)]$ [Equation B]

$n=(\lambda n-3\lambda n+1)/(2\lambda n+1+1-2\lambda n)$ [Equation C]

Here, R means a in-plane phase difference (Rin), λ means a wavelength, and n means a nodal degree of a sine waveform.

Evaluation Example 3: Thickness Evaluation of Light Modulation Layer

Since the thickness (cell gap) of the light modulation layer approximately coincided with the height of the spacer, the height of the spacer was checked using a measuring device (Optical Profiler, Nano System, Nano View-E1000), whereby the thickness (cell gap) of the light modulation layer was obtained.

Evaluation Example 4: Refractive Index Anisotropy Evaluation of Light Modulation Layer The refractive index anisotropy (Δn) of the light modulation layer is evaluated in the following manner using an Abbe refractometer. By coating a vertical alignment film on the measuring prism and illumination prism surfaces of the Abbe refractometer and coating a liquid crystal compound to be measured on the measuring prism and then covering it with the illumination prism, the liquid crystal compound is vertically oriented by the vertical orientation force of the two interfaces. The liquid crystal compound applied in the above process is only the liquid crystal compound, which is applied to the light modulation layer, without mixing with other materials such as dichroic dye.

Figure 4:
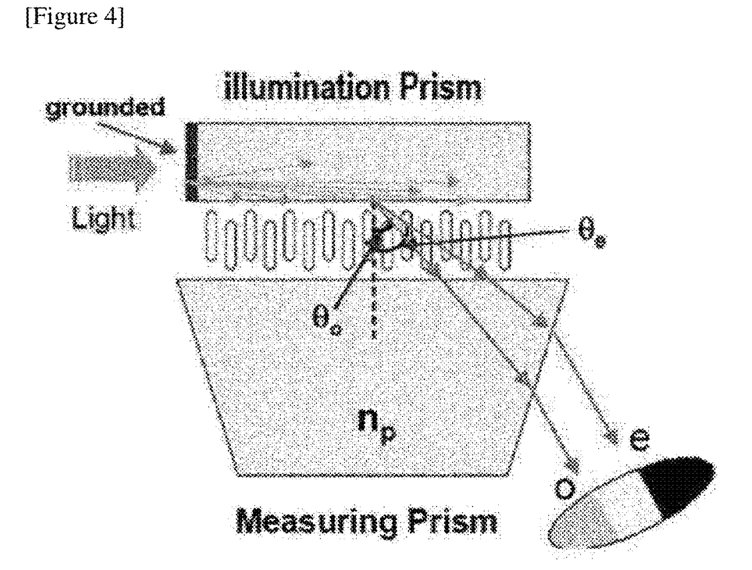
FIG. 4 is a diagram showing a method for evaluating refractive index anisotropy.

Then, as shown in FIG. 4, when a linear polarizer is applied to the eyepiece side (grounded) and irradiated with light to be observed, $\theta_e$ and $\theta_o$ as shown in FIG. 4 can be obtained and the extraordinary refractive index ($n_e = n_p \sin \theta_e$) and the ordinary refractive index ($n_o = n_p \sin \theta_o$) can be obtained through the refractive index ($n_p$) of the measuring prism and the angles ($\theta_e$ and $\theta_o$), where the difference ($n_e - n_o$) may be defined as the refractive index anisotropy. The reference wavelength upon measurement is approximately 550 nm.

Example 1

As first and second polymer film substrates, a device was manufactured using a stretched PET (polyethylene terephthalate) film substrate (thickness: 145 μm, manufacturer: SKC). The PET film substrate had a in-plane phase difference of about 10,000 nm to 15,000 nm for light with a wavelength of 550 nm.

First, an ITO (indium tin oxide) film (conductive layer) was deposited on one side of the first polymer film substrate, and then a silicone pressure-sensitive adhesive (Shinetsu, KR3700) was bar-coated on the ITO film and then cured at about 100° C. for 100 minutes to form a pressure-sensitive adhesive layer having a thickness of about 10 μm (first substrate).

First, an ITO (indium tin oxide) film (conductive layer) was deposited on one side of the second polymer film substrate, and spacers (pitch: 350 μm, height: 8 μm, line width: 25.2 μm, area ratio: 13.9%) in the form of a square partition for maintaining a cell gap were formed on the ITO film. At this time, when the spacer was observed from the top, each side of the square, as a closed figure, formed by the partition was disposed so as to be parallel or perpendicular to the slow axes of the first and second polymer film substrates. Thereafter, a polyimide-based vertical alignment film (SE-5661LB3, Nissan) having a thickness of approximately 100 nm was formed for initial orientation control of the light modulation layer (liquid crystal layer), and then subjected to rubbing with a rubbing cloth. At this time, the rubbing direction was set to be horizontal to the slow axis of the second polymer film substrate (second substrate).

Subsequently, the pressure-sensitive adhesive layer of the first substrate and the alignment film of the second substrate were disposed to face each other (cell gap: 8 μm), and a liquid crystal material was injected therein, and then a device was manufactured through a lamination process. As the liquid crystal material, a composition that a chiral dopant (S811, Merck) was mixed with a liquid crystal compound (SHN-7002XX T12, JNC) having negative dielectric constant anisotropy with a refractive index anisotropy (Δn) of approximately 0.094 and an average refractive index of 1.58 was used. At this time, about 0.5 parts by weight of the chiral dopant was mixed with respect to 100 parts by weight of the liquid crystal compound, so that the chiral pitch was approximately 20 μm or so.

Subsequently, a first polarization layer was attached to the surface of the first polymer film substrate on which the ITO film (conductive layer) was not formed, and a second polarization layer was attached to the surface of the second polymer film substrate on which the ITO film (conductive layer) was not formed. As the first and second polarization layers, a general PVA polarization layer prepared through high temperature/stretching by adsorbing iodine on a PVA film was used.

The arrangement was performed so that the slow axis directions of the first and second polymer film substrates were parallel to each other, the slow axes of the first and second polymer film substrates and the absorption axis of the first polarization layer were parallel to each other, and the absorption axis of the second polarization layer was perpendicular to the absorption axis of the first polarization layer.

As a result, the light modulation device comprising the structure of the first polarization layer/first polymer film substrate/ITO film/pressure-sensitive adhesive layer/light modulation layer (liquid crystal layer)/alignment film/ITO film/second polymer film substrate/second polarization layer was formed.

Figure 5:
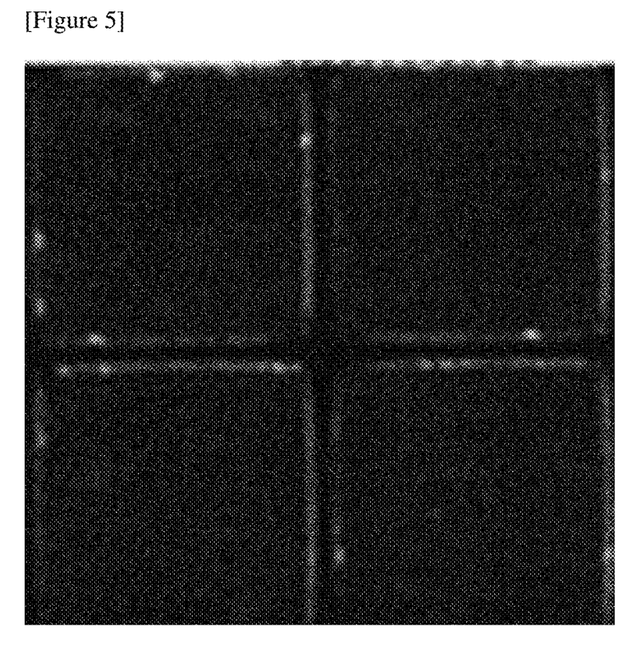
FIG. 5 shows the light leakage evaluation result in the black mode for the light modulation device of Example 1.

The light leakage in the black mode was evaluated for the light modulation device of Example 1 formed as above, and the results were shown in Table 1 and FIG. 5.

Comparative Example 1

A light modulation device was manufactured in the same manner as in Example 1, except that honeycomb-shaped spacers (pitch: 379 μm, height: 8 μm, line width: 26.5 μm, area ratio: 13.5%) in the form of a regular hexagon were formed on the ITO film (conductive layer) formed on the second polymer film substrate. In this case, when the spacer was observed from the top, the angle formed by each of the sides forming the regular hexagon, the absorption axes of the first and second polarization layers, and the slow axes of the first and second polymer film substrates was set to be approximately 30 degrees or 60 degrees.

Figure 6:
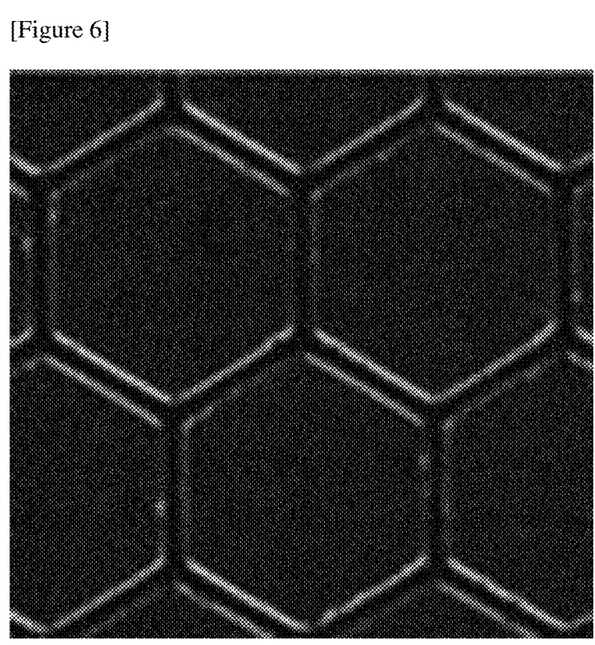
FIG. 6 shows the light leakage evaluation result in the black mode for the light modulation device of Comparative Example 1.

The light leakage in the black mode was evaluated for the light modulation device of Comparative Example 1 formed as above, and the results were shown in Table 1 and FIG. 6.

Comparative Example 2

A light modulation device was manufactured in the same manner as in Example 1, except that when the spacer in the form of a square partition formed on one side of the second polymer film substrate was observed from the top, each side of the square, as a closed figure, formed by the partition was disposed so as to form 30 degrees or 60 degrees with the slow axes of the first and second polymer film substrates.

The light leakage in the black mode was evaluated for the light modulation device of Comparative Example 2 formed as above, and the results were shown in Table 1.

Comparative Example 3

A light modulation device was manufactured in the same manner as in Example 1, except that when the spacer in the form of a square partition formed on one side of the second polymer film substrate was observed from the top, each side of the square, as a closed figure, formed by the partition was disposed so as to form 45 degrees with the slow axes of the first and second polymer film substrates.

The light leakage in the black mode was evaluated for the light modulation device of Comparative Example 3 formed as above, and the results were shown in Table 1.

The haze and transmittance in the black mode and the transparent mode measured for the light modulation devices of Examples and Comparative Examples are compared as Table 1 below.

TABLE 1

| Classification | Transmittance (%) | | Haze (%) | |
| --- | --- | --- | --- | --- |
| | Black mode (0 V) | Transparent mode (40 V) | Black mode (0 V) | Transparent mode (40 V) |
| Example 1 | 0.27 | 27.87 | 44.44 | 1.97 |
| Comparative Example 1 | 0.44 | 28.31 | 52.27 | 2.37 |
| Comparative Example 2 | 0.56 | 27.79 | 47.95 | 2.57 |
| Comparative Example 3 | 0.82 | 27.58 | 51.31 | 3.44 |

The invention claimed is:

1. A light modulation device comprising:
a first polymer film substrate having a first surface and a second surface;
an adhesive layer or a pressure-sensitive adhesive layer disposed on the first surface of the first polymer film substrate;
a first polarization layer disposed on the second surface of the first polymer film substrate,
a second polymer film substrate having a first surface and a second surface;
a liquid crystal alignment film disposed on the first surface of the second polymer film substrate;
a second polarization layer disposed on the second surface of the second polymer film substrate;
a light modulation layer present between the first and second polymer film substrates; and
tetragonal partition spacers present between the first and second polymer film substrates,
wherein the light modulation layer contains a liquid crystal compound,
wherein the first and second polymer film substrates are disposed so that the first surfaces face each other, and
wherein an interval between the oppositely disposed first and second polymer film substrates is maintained by the tetragonal partition spacers, and
wherein angles formed by a slow axis of each of the first and second polymer film substrates and each side of the tetragonal partition spacer are in a range of −25 degrees to 25 degrees or in a range of 65 degrees to 115 degrees.

2. The light modulation device according to claim 1, wherein the spacers are square or rectangular partition spacers.

3. The light modulation device according to claim 1, wherein angles formed by an absorption axis of each of the first and second polarization layers and each side of the tetragonal partition spacer are in the range of −25 degrees to 25 degrees or in the range of 65 degrees to 115 degrees.

4. The light modulation device according to claim 1, wherein absorption axes of the first and second polarization layers are perpendicular to each other.

5. The light modulation device according to claim 1, wherein the slow axes of the first and second polymer film substrates are parallel to each other.

6. The light modulation device according to claim 1, wherein the first and second polymer film substrates each have an in-plane phase difference of 500 nm or more for a wavelength of 550 nm.

7. The light modulation device according to claim 1, wherein an initial orientation of the liquid crystal compound in the light modulation layer is a vertical orientation and wherein the vertical orientation is capable of being changed to a horizontal orientation by application of an external signal.

8. The light modulation device according to claim 1, wherein the light modulation layer further comprises a chiral dopant.

9. The light modulation device according to claim 1, wherein the light modulation layer has a thickness of 20 μm or less.

10. The light modulation device according to claim 1, wherein the adhesive layer or the pressure-sensitive adhesive layer comprises an adhesive having vertical orientation force.

11. The light modulation device according to claim 10, wherein the adhesive having vertical orientation force is a silicone adhesive.

12. The light modulation device according to claim 10, wherein the adhesive having vertical orientation force is a solid adhesive, a semi-solid adhesive, an elastic adhesive or a liquid adhesive.

13. The light modulation device according to claim 1, wherein no liquid crystal alignment film is formed on the first polymer film substrate.

14. The light modulation device according to claim 1, wherein conductive layers are each formed between the adhesive layer or the pressure-sensitive adhesive layer and the first polymer film substrate and between the liquid crystal alignment film and the second polymer film substrate.

15. A vehicle comprising:
a vehicle body having one or more openings formed therein; and the
light modulation device of claim 1 mounted on the openings.

* * * * *